United States Patent Office 3,130,004
Patented Apr. 21, 1964

3,130,004
PROCESS FOR THE PURIFICATION AND ACTIVATION OF TITANIUM TRICHLORIDE
Erhard Siggel, Laudenbach (Main), Gerhard Meyer, Obernburg (Main), and Wolfgang Rösener, Erlenbach (Main), Germany, assignors to Vereinigte Glanzstoff-Fabriken AG, Wuppertal-Elberfeld, Germany
No Drawing. Filed Sept. 5, 1961, Ser. No. 135,789
Claims priority, application Germany Sept. 7, 1960
3 Claims. (Cl. 23—87)

The present invention is directed to a process for activating and purifying titanium trichloride and to the use of said titanium trichloride in olefin polymerization reactions. More particularly, the present invention is directed to a process for obtaining substantially pure and active titanium trichloride from titanium tetrachloride.

Titanium trichloride is often used as a catalyst in polymerizing olefins, especially in polymerizing propylene. One of the best known and most advantageous methods for producing titanium trichloride includes the step of reducing titanium tetrachloride. The reduction of titanium tetrachloride to form titanium trichloride can be carried out at high temperatures with hydrogen or by a simpler process with aluminum organic compounds.

When using titanium trichloride in the polymerization of alpha-olefins it is essential that a high degree of purity be obtained. This means that the titanium trichloride should be free or substantially free from titanium tetrachloride. Literature references which are directed to olefin polymerization processes or the manufacture of catalysts which are used in such processes frequently point out that the titanium trichloride must be purified. For the production of high crystalline and purified titanium trichloride, it is necessary to wash the material repeatedly with heptane (see Natta, SPE Journal, May 1959).

Even though the titanium trichloride is washed repeatedly with heptane, it still does not have the degree of purity which is required for the polymerization of olefins. This is established by the fact that the yield of isotactic polymerizate is too low. When titanium trichloride, which has been purified by repeated washings with heptane, is used as a catalyst, the yield of isotactic polymerizate is only about 70% to 80%. This is true even though claims have been made that greater yields are obtainable. Yields of 90% of isotactic polypropylene, for example, are not accurate insofar as they refer to the proportion of isotactic polypropylene after the separation of the polymerizate from the liquids used in the polymerization process. It is known that the polymerization is carried out in dispersion agents such as n-heptane. At the end of the process alcohol is added to the polymerizate dispersion which is then syphoned off with the bulk of the polymerizate. A portion of the atactic polymerizate substances, however, remains dissolved in the dispersion agent and is syphoned off with said agent. This can easily be determined by evaporation. Depending on the nature of the dispersion agent, it may contain from about 5% to 20% atactic polymerizate based on the total polymerizate. This quantity of polymerizate must be taken into account when calculating the yield of isotactic polymerizate, that is, this amount must be added to the percentage of the atactic substances contained in the solid polymerizate.

It is an object of the present invention to provide an improved method of purifying titanium trichloride.

Another object of the invention is to provide an improved method of producing substantially pure and activated titanium trichloride from titanium tetrachloride.

Still another object is to provide an improved process for polymerizing olefins.

Other objects of the invention will become apparent to those skilled in the art from the following detailed description.

In general, the present invention comprises the discovery that substantially pure titanium trichloride can be obtained if the titanium trichloride is treated with an organic solvent containing water after preliminary purification of the titanium trichloride by washing with inert hydrocarbons. The quantity of water which is used in the treatment step varies from about 0.1 to 20 mol percent, and preferably 0.1 to 10 mol percent, based on the quantity of titanium trichloride. The treatment preferably is carried out by heating the titanium trichloride with the water-saturated organic solvent under reflux. It is important, however, that the treatment emperature of 100° C. is not exceeded.

The organic solvents must be either mixable with water or must be capable of dissolving in water. It is preferred that the solvents be either alkanes, cycloalkanes, aromatic or alkyl aromatic hydrocarbons having from 5 to 15 carbon atoms. Suitable solvents would include n-heptane, hexane, isooctane, benzene, ethylbenzene, diethylbenzene, triethylbenzene, methylpropyl benzene, phenylbutane, phenylpentane, toluene, xylene, ethyl toluene, cymene, cyclobutane, cyclopentane, cyclohexane, methyl cyclohexane, cycloheptane, pentane, nonane, dodecane, decaline, tetraline, and benzine fractions having boiling points ranging from 50° to 200° C. among others. Suitable inert hydrocarbons which can be used in the preliminary washing step of the process would include the same compounds which are listed above.

The following table shows typical organic solvents and the amount of water in molar percent which the solvents can hold at particular temperatures.

| Hydrocarbon: | Amount of water in mol percent which is miscible or soluble at given temperatures, ° C. |
|---|---|
| Hexane | 0.25–20 |
| Heptane | 0.08–25 |
| Cyclohexane | 0.23–55 |
| Benzene | 1.50–80 |
| Toluene | 1.86–90 |
| Xylene | 0.22–25 |

In the purification process, the titanium trichloride initially is washed at least once with an inert hydrocarbon and preferably is washed at least twice with an inert hydrocarbon. Thereafter, the titanium trichloride is contacted with the water-organic solvent mixture or solution at a temperature not exceeding 100° C. In our preferred embodiment, the titanium trichloride is heated with the water-saturated organic solvent under reflux. Purification may also be carried out at temperatures as low as 10° C. in which case the reaction mixture must be vigorously agitated. The treatment time can vary over a wide range, depending upon the temperature employed, for example, from 0.5 minute to 3 hours.

If titanium trichloride is purified in accordance with this invention and is used in a known manner together with an aluminum organic compound such as an aluminum trialkyl as a catalyst in the polymerization of olefins, an increase of yield of isotactic polymerizate of 10% and more can be obtained.

In the following examples the process is illustrated and is also compared with a prior art process.

*Example 1*

Eight (8) g. of titanium trichloride, which was produced by the reduction of titanium tetrachloride with hydrogen at 800° C., was washed with 50 cc. n-heptane for 15 minutes at 20° C. and then syphoned. The n-heptane had previously been purified by distillation over metallic sodium and was stored over sodium wire and under a nitrogen atmosphere. The washing with n-heptane was repeated. Thereafter, the titanium trichloride with n-heptane to which 10 mole percent water (based on the amount of titanium trichloride) had been added was heated to 70° C. for one hour. After syphoning off the heptane, the above described washing with n-heptane was repeated twice more.

The titanium trichloride which was purified as described above was placed in an enamelled autoclave along with 20 cc. of aluminum triethyl and 12 liters of n-heptane. The autoclave was equipped with a stirring device and had a 20 liter useable capacity. The reaction mixture was heated to 75° C. Thereafter, enough propylene was added to increase pressure in the autoclave by 4 atmospheres and the polymerization was continued until the polymerizate concentration was about 20%. The remaining propylene pressure was then removed and the autoclave contents were transferred to a vessel containing about 4 liters of a 1% hydrochloric acid solution in ethanol. The catalyst was dissolved by brisk stirring. After cooling to 20° C. the polymerizate was syphoned off and washed with water until a neutral reaction was obtained. The dried polymerizate was extracted in a hot extractor with n-heptane for 24 hours. The total soluble polymerizate portion in n-heptane amounted to 7.1%. The portion of isotactic polypropylene, therefore, was 92.9%.

*Example II*

In this example, a quantity of 8 g. of titanium trichloride, which was produced and preliminarily purified as described in Example I, was heated to 70° C. for one hour with n-heptane to which had been added 4 mol percent of water (based on the amount of titanium trichloride). Thereafter, the heptane was syphoned off and the titanium trichloride was washed twice with n-heptane as was described in Example I and was placed in an enamelled autoclave along with 20 cc. of aluminum triethyl and 12 liters of n-heptane. The autoclave was heated to 75° C., whereupon 4 atmospheres of propylene was added to the autoclave. After the polymerization process had been completed, the polymerizate was purified as described in Example I. The total soluble polymerizate portion in n-heptane amounted to 8% and, therefore, the isotactic polypropylene amounted to 92%.

*Example III*

This example illustrates the results that are obtained by following prior art procedures. In this example a quantity of 4 g. of titanium trichloride, which was produced as described in Example I, was washed six times with 50 cc. n-heptane at 20° C. The titanium trichloride was placed in a 7 liter enamelled autoclave having a stirring device along with 10 cc. aluminum triethyl and 5 liters of n-heptane. The autoclave was heated to 75° C. and 4 atmospheres propylene was added to the vessel. After completion of the polymerization reaction the polymerizate was purified and dried as described in Example I. The polymerizate contained a total of 29% of substances which were extractable with n-heptane and, therefore, 71% of isotactic polypropylene was obtained.

Obviously many modifications and variations of the invention as hereinbefore set forth may be made without departing from the spirit and scope thereof, and therefore only such limitations should be imposed as are indicated in the appended claims.

We claim:
1. In a process for purifying, activating, and improving the catalytic properties of titanium trichloride which has been produced by the reduction of titanium tetrachloride and is contaminated with titanium tetrachloride and which has been washed with an inert hydrocarbon, the improvement which comprises: heating said titanium trichloride in the absence of olefin in a vessel at a temperature not exceeding 100° C. with an organic solvent saturated with water for a period of from 0.5 minute to 3 hours, the amount of water in said vessel being from 0.1 to 20 mol percent based on the amount of titanium trichloride that is present in the vessel, syphoning off the organic solvent containing said water, and washing the titanium trichloride once again with an inert hydrocarbon, whereby an activated and substantially moisture and titanium tetrachloride free catalyst is obtained.

2. In a process for purifying, activating, and improving the catalytic properties of titanium trichloride which has been produced by the reduction of titanium tetrachloride and is contaminated with titanium tetrachloride and which has been washed with n-heptane, the improvement which comprises: heating said titanium trichloride in the absence of olefin in a vessel at a temperature not exceeding 100° C. with n-heptane saturated with water for a period of from 0.5 minute to 3 hours, the amount of water in said vessel being from 0.1 to 10 mol percent based on the amount of titanium trichloride that is present in the vessel, syphoning off said n-heptane containing said water, and washing the titanium trichloride once again with n-heptane, whereby an activated and substantially moisture and titanium tetrachloride free catalyst is obtained.

3. In a process for purifying, activating, and improving the catalytic properties of titanium trichloride which has been produced by the reduction of titanium tetrachloride and is contaminated with titanium tetrachloride and which has been washed with an inert hydrocarbon, the improvement which comprises: heating said titanium trichloride in the absence of olefin in a vessel at a temperature not exceeding 100° C. with an organic solvent saturated with water for a period of from 0.5 minute to 3 hours, said organic solvent being selected from the group consisting of n-heptane, hexane, isooctane, benzene, ethylbenzene, diethylbenzene, triethylbenzene, methylpropyl benzene, phenylbutane, phenylpentane, toluene, xylene, ethyl toluene, cymene, cyclobutane, cyclopentane, cyclohexane, methyl cyclohexane, cycloheptane, pentane, nonane, dodecane, decaline, tetraline, and benzine fractions having boiling points ranging from 50° to 200° C., the amount of water in said vessel being from 0.1 to 20 mol percent based on the amount of titanium trichloride that is present in the vessel, syphoning off the organic solvent containing said water, and washing the titanium trichloride once again with an inert hydrocarbon, whereby an activated and substantially moisture and titanium tetrachloride free catalyst is obtained.

References Cited in the file of this patent

UNITED STATES PATENTS

| | | |
|---|---|---|
| 2,909,511 | Thomas | Oct. 20, 1959 |
| 2,925,392 | Seelbach et al. | Feb. 16, 1960 |
| 2,938,890 | D'Alelio | May 31, 1960 |
| 2,984,658 | Seydel et al. | May 16, 1961 |
| 3,063,798 | Langer | Nov. 13, 1962 |